United States Patent
Katakura

(10) Patent No.: US 6,978,691 B2
(45) Date of Patent: Dec. 27, 2005

(54) SHIFT CONTROL APPARATUS AND METHOD FOR AUTOMATED TWIN CLUTCH TRANSMISSION

(75) Inventor: Takeji Katakura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 91 days.

(21) Appl. No.: 10/804,117

(22) Filed: Mar. 19, 2004

(65) Prior Publication Data

US 2004/0182187 A1    Sep. 23, 2004

(30) Foreign Application Priority Data

Mar. 19, 2003   (JP) ............................ 2003-076447

(51) Int. Cl.⁷ .............................................. F16H 3/08
(52) U.S. Cl. ........................................ 74/331; 74/335
(58) Field of Search ................................ 74/331, 335

(56) References Cited

U.S. PATENT DOCUMENTS 6,490,944 B1 * 12/2002 Heinzel et al. ............... 74/335
6,638,197 B2 * 10/2003 Ogawa et al. ............... 477/174
6,883,394 B2 *  4/2005 Koenig et al. ................ 74/335

FOREIGN PATENT DOCUMENTS

JP            9-196164 A     7/1997
JP         2001-295898 A    10/2001

* cited by examiner

*Primary Examiner*—Dirk Wright
(74) *Attorney, Agent, or Firm*—Foley & Lardner LLP

(57) ABSTRACT

A shift control apparatus for an automated twin clutch transmission includes a shifting movement detecting device operable to detect start of shifting movement of a shift instructing device and output a shift starting instruction, and a shift controller configured to perform, in response to the shift starting instruction, a pre-shift control by releasing one of the first and second engine clutches from a power transmission route of a pre-shift gear ratio and engaging one of the shift clutches corresponding to a post-shift gear ratio, and perform, in response to a shift instruction form a shift instruction outputting device, a gearshift by releasing the other of the first and second engine clutches from the power transmission route of the pre-shift gear ratio and engaging the above-mentioned one of the first and second engine clutches. A shift control method is also provided.

20 Claims, 6 Drawing Sheets

FIG.8
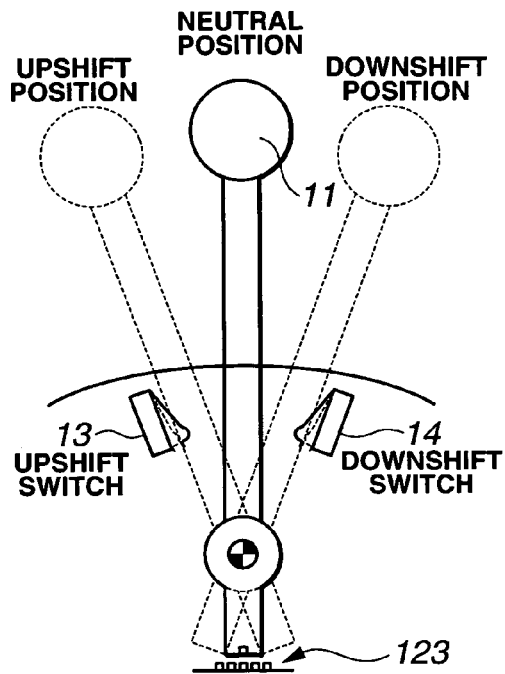
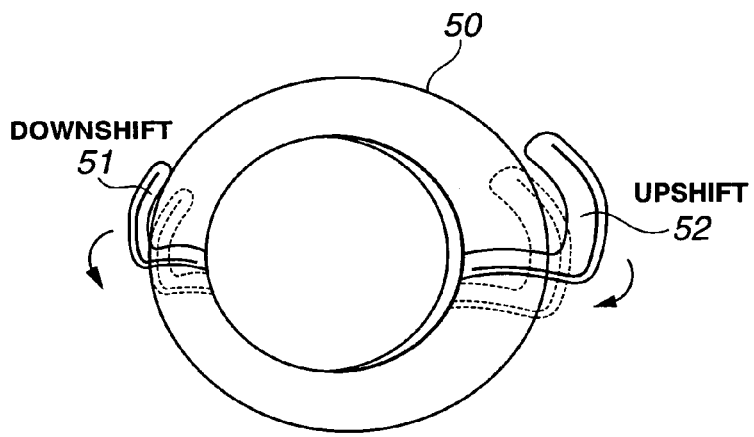
FIG.9A
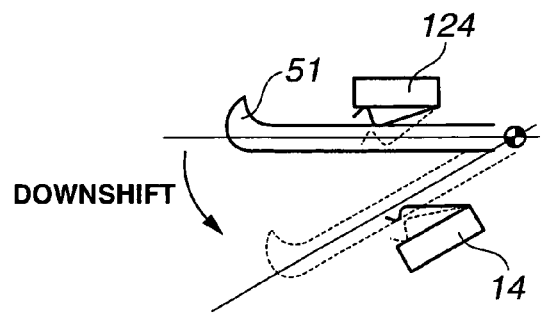
FIG.9B

SHIFT CONTROL APPARATUS AND METHOD FOR AUTOMATED TWIN CLUTCH TRANSMISSION

BACKGROUND OF THE INVENTION

The present invention relates in general to transmissions for motor vehicles and more particularly to a shift control apparatus and method for an automated twin clutch transmission capable of shifting automatically in response to a shift instruction from a shift mechanism.

Japanese Unexamined Patent Publication No. 2001-295898 discloses an automated twin clutch transmission including two power transmission routes consisting of two input shafts and a plurality of synchronous meshing type gearsets. The transmission further includes two engine clutches each disposed between an engine and each input shaft for controlling transmission of a drive torque therebetween. In such a transmission, a clutch engagement and disengagement control and a gear selection control are performed automatically.

SUMMARY OF THE INVENTION

The above-described shift control apparatus has the following problem. Namely, in the above-described shift control apparatus, a gearshift control is started after a shift instruction is issued. More specifically, in the gearshift control by the above-described shift control apparatus, an engine clutch for a post-shift gear ratio (i.e., an engine establishing a power transmission route of the post-shift gear after shifting) is first released while a shift clutch for a post-shift gear ratio (i.e., a shift clutch for a gear ratio to be attained after shifting) is engaged (pre-shift control). Then, the engine clutch for the post-shift gear ratio is engaged while an engine clutch for a pre-shift gear ratio (i.e., an engine clutch establishing a power transmission route of the pre-shift gear till shifting) is released (clutch connection changing control). Thereafter, the shift clutch for the pre-shift gear ratio is released and the engine clutch for the pre-shift gear ratio is engaged again (post-shift control). In the above-described control, the time necessary for the pre-shift control results in a response delay which gives a strange or embarrassed feel to a vehicle driver.

It is accordingly an object of the present invention to provide a shift control apparatus for an automated twin clutch transmission that can prevent a response delay at the time of gearshift.

It is a further object of the present invention to provide an automated twin clutch transmission with the shift control apparatus of the foregoing character.

It is a further object of the present invention to provide a shift control method for an automated twin clutch transmission, which is of the foregoing character.

To achieve the above object, there is provided according to an aspect of the present invention a shift control apparatus for an automated twin clutch transmission including a first input shaft on which a drive-side gear for attaining a first forward gear ratio and a drive-side gear for attaining a third forward gear ratio are supported, a first engine clutch operable to establish a releasable drive connection between an engine and the first input shaft, a second input shaft on which a drive-side gear for attaining a second forward gear ratio and a drive-side gear for attaining a fourth forward gear ratio are supported, a second engine clutch operable to establish a releasable drive connection between the engine and the second input shaft, an output shaft on which driven-side gears meshed with the respective drive-side gears are supported, and a plurality of shift clutches operable to establish releasable drive connections between the drive-side gears and the first and second input shafts and between the driven-side gears and the output shaft, the shift control apparatus comprising a shift controller operable to control engagement and release of the first and second engine clutches and the shift clutches thereby attaining a desired gear ratio, a shift instructing device operable to instruct a gearshift when operated by a vehicle driver so as to move a predetermined amount from a neutral position, a shift instruction outputting device operable to output a shift instruction when the shift instructing device is caused to move the predetermined amount from the neutral position, and a shifting movement detecting device operable to detect shifting movement of the shift instructing device before the shift instruction is outputted by the shift instruction outputting device and output a shift starting instruction representative thereof, the shift controller being configured to perform, in response to the shift starting instruction from the shifting movement detecting device, a pre-shift control by releasing one of the first and second engine clutches from a power transmission route of a pre-shift gear ratio and engaging one of the shift clutches corresponding to a post-shift gear ratio, and perform, in response to the shift instruction form the shift instruction outputting device, a gearshift by releasing the other of the first and second engine clutches from the power transmission route of the pre-shift gear ratio and engaging said one of the first and second engine clutches.

There is provided according to another aspect of the present invention an automated twin clutch transmission comprising an output shaft, first and second input shafts, a first engine clutch operable to establish a releasable drive connection between an engine and the first input shaft, a second engine clutch operable to establish a releasable drive connection between the engine and the second input shaft, a plurality of drive-side gears supported by the first and second input shafts, a plurality of driven-side gears supported by the output shaft, a plurality of shift clutches operable to engage the drive-side gears with the first and second input shafts and the driven-side gears with the output shaft, selectively, a shift controller operable to control engagement and release of the first and second engine clutches and the shift clutches thereby attaining a desired gear ratio, a shift instructing device operable to instruct a gear shift when operated by a vehicle driver so as to move a predetermined amount from a neutral position, a shift instruction outputting device that outputs a shift instruction when the shift instructing device is caused to move the predetermined amount from the neutral position, and a shifting movement detecting device operable to detect start of shifting movement of the shift instructing device from the neutral position and output a shift starting instruction when the shift instructing device starts moving from the neutral position, the shift controller being configured to perform, in response to the shift starting instruction from the shifting movement detecting device, a pre-shift control by releasing one of the first and second engine clutches from a power transmission route of a pre-shift gear ratio and engaging one of the shift clutches corresponding to a post-shift gear ratio, and perform, in response to the shift instruction form the shift instruction outputting device, a gearshift by releasing the other of the first and second engine clutches from the power transmission route of the pre-shift gear ratio and engaging said one of the first and second engine clutches.

There is provided according to a further aspect of the present invention a shift control method for an automated twin clutch transmission including a first input shaft on which a drive-side gear for attaining a first forward gear ratio and a drive-side gear for attaining a third forward gear ratio are supported, a first engine clutch operable to establish a releasable drive connection between an engine and the first input shaft, a second input shaft on which a drive-side gear for attaining a second forward gear ratio and a drive-side gear for attaining a fourth forward gear ratio are supported, a second engine clutch operable to establish a releasable drive connection between the engine and the second input shaft, an output shaft on which driven-side gears meshed with the respective drive-side gears are supported, a plurality of shift clutches operable to establish releasable drive connections between the drive-side gears and the first and second input shafts and between the driven-side gears and the output shaft, a shift controller operable to control engagement and release of the first and second engine clutches and the shift clutches thereby attaining a desired gear ratio, a shift instructing device operable to instruct a gearshift when operated by a vehicle driver so as to move a predetermined amount from a neutral position, and a shift instruction outputting device operable to output a shift instruction when the shift instructing device is caused to move the predetermined amount from the neutral position, the shift control method comprises detecting shifting movement of the shift instructing device before the shift instruction is outputted by the shift instruction outputting device and outputting a shift starting instruction representative thereof, performing, in response to the shift starting instruction, a pre-shift control by releasing one of the first and second engine clutches from a power transmission route of a pre-shift gear ratio and engaging one of the shift clutches corresponding to a post-shift gear ratio, and performing, in response to the shift instruction form the shift instruction outputting device, a gearshift by releasing the other of the first and second engine clutches from the power transmission route of the pre-shift gear ratio and engaging said one of the first and second engine clutches.

BRIEF DESCRIPTION OF THE DRAWINGS

FIG. 8 is a schematic view of a shift mechanism according to a fourth embodiment of the present invention; and FIGS. 9A and 9B are schematic views of a shift mechanism according to a fifth embodiment of the present invention.

DESCRIPTION OF THE PREFERRED EMBODIMENTS

Figure 1:
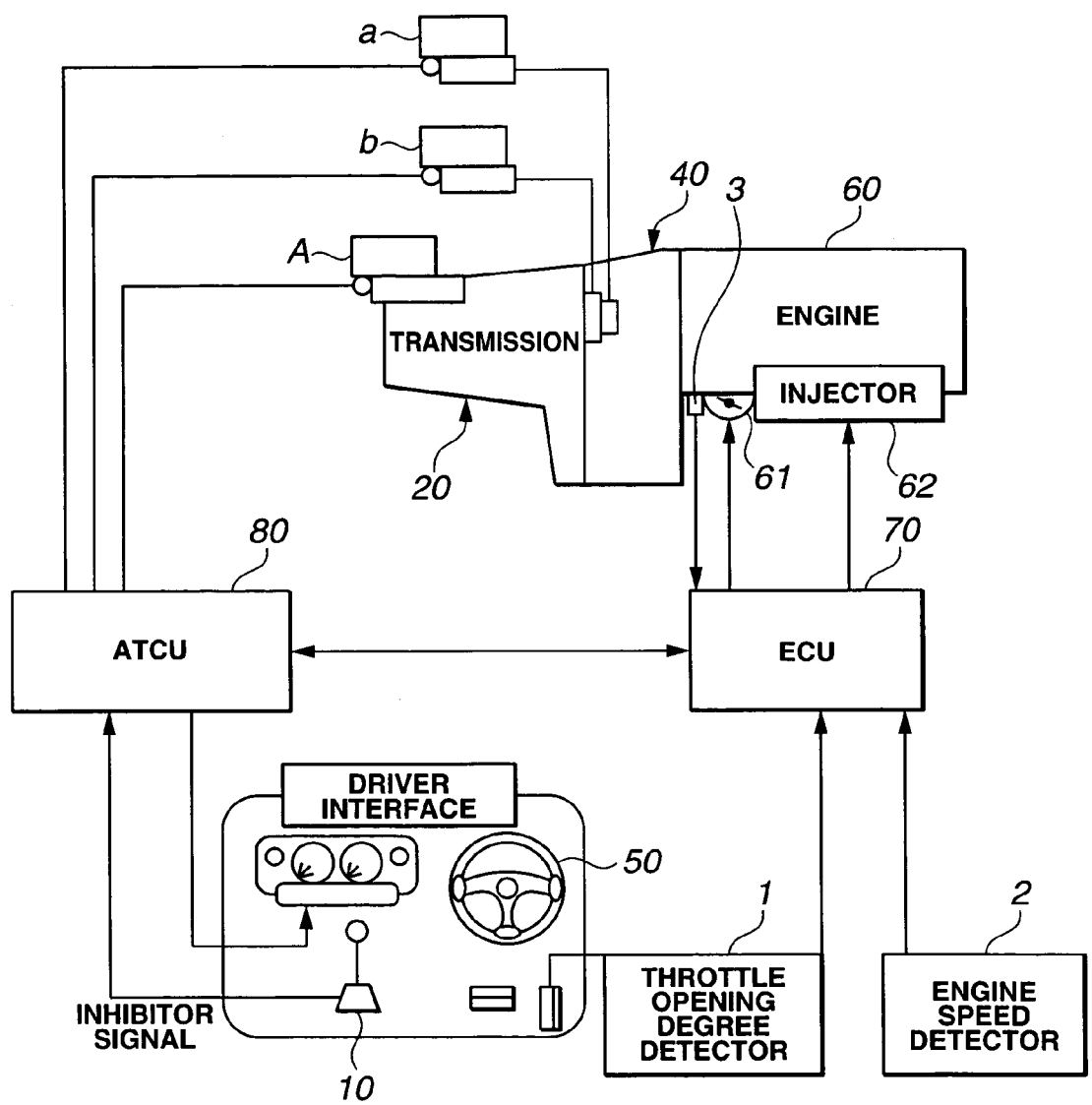
FIG. 1 is a systematic view of an automated twin clutch transmission having incorporated therein a shift control apparatus according to an embodiment of the present invention.

In FIG. 1, 60 is an engine, 61 is an electronically controlled throttle that controls a throttle opening electronically, 62 is an injector that controls a fuel injection amount, 40 is an electromagnetic clutch, 20 is an automated twin clutch transmission, 70 is an engine control unit (hereinafter referred to simply as ECU), and 80 is a transmission control unit (hereinafter referred to simply as ATCU).

Inputted to ECU 70 from accelerator opening degree detector 1, engine speed detector 2 and throttle opening degree detector 3 are signals representative of an accelerator opening degree, engine speed and throttle opening degree, respectively. Inputted to ATCU 80 are signals such as a vehicle speed signal and an upshift signal or downshift signal caused when shift mechanism 10 is operated. ECU 70 and ATCU 80 transmit and receive signals that are detected thereby, to and from each other. ECU 70 outputs control signals for controlling a throttle opening and a fuel injection quantity. ATCU 80 outputs control signals to shift actuator A and clutch actuators "a", "b" of electromagnetic clutch 40.

Figure 2:
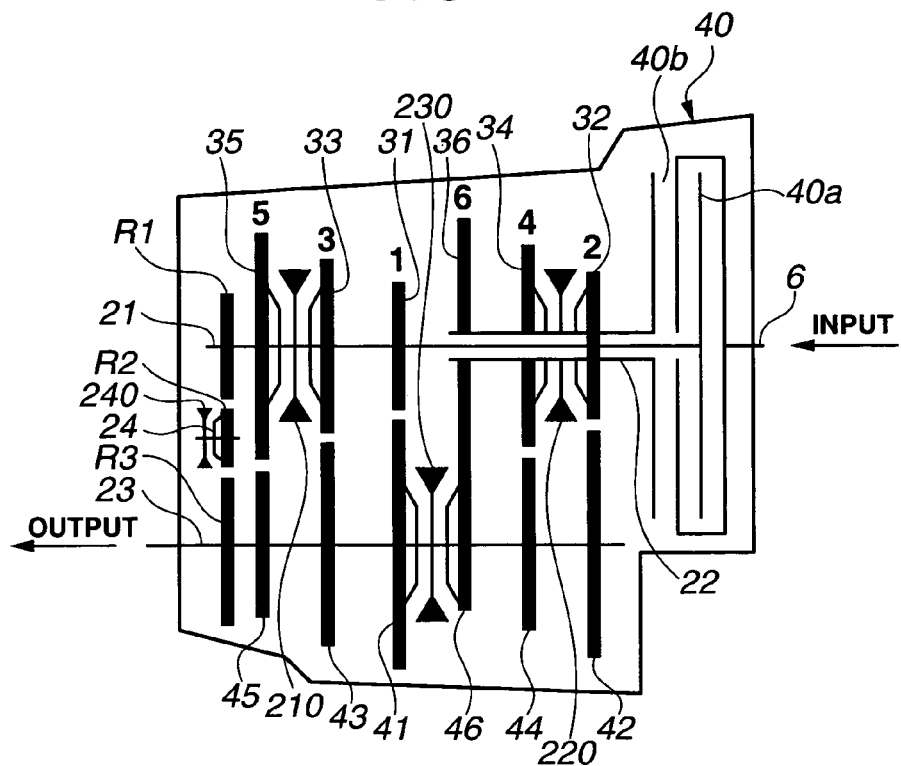
FIG. 2 is a schematic view of a gear train of the automated twin clutch transmission of FIG. 1.

Referring to FIG. 2, automated twin clutch transmission 20 will be described. In FIG. 2, electromagnetic clutch assembly 40 is a twin clutch and includes a first engine clutch 40a operable to establish a releasable drive connection between first input shaft 21 and engine output shaft 6 by means of clutch actuator "a" (refer to FIG. 1) and second engine clutch 40b operable to establish a releasable drive connection between second output shaft 22 and engine output shaft 6 by means of clutch actuator "b" (refer to FIG. 1).

On input shaft 21 are supported drive-side first speed gear 31, drive-side third speed gear 33, drive-side fifth speed gear 35 and drive-side first reverse gear R1.

Drive-side first speed gear 31 and drive-side first reverse gear R1 are coupled with first input shaft 21 so as to rotate together therewith, whereas drive-side third speed gear 33 and drive-side fifth speed gear 35 are rotatably supported on first input shaft 21.

Second input shaft 22 is disposed concentric with first input shaft 21 so as to surround the same. On second input shaft 22 are supported drive-side second speed gear 32, drive-side fourth speed gear 34 and drive-side sixth speed gear 36. Drive-side sixth speed gear 36 is coupled with second input shaft 22 so as to be rotatable together therewith, whereas drive-side second speed gear 32 and drive-side fourth speed gear 34 are freely rotatable relative to second input shaft 22.

In parallel with first and second input shafts 21, 22 are provided output shaft 23 and auxiliary shaft 24. On output shaft 23 are supported driven-side first to sixth speed gears 41, 42, 43, 44, 45, 46 and third reverse gear R3. Driven-side second to fifth speed gears 42, 43, 44, 45 and third reverse gear R3 are coupled with output shaft 23 so as to be rotatable together therewith, whereas driven-side first speed and sixth speed gears 41, 46 are rotatably supported on output shaft 23. Further, on auxiliary shaft 24 is supported second reverse gear R2. Second reverse gear R2 is rotatably supported on auxiliary shaft 24.

On first input shaft 21 is provided 3-5 shift clutch 210. On second input shaft 22 is provided 2-4 shift clutch 220. On output shaft 23 is provided 1-6 shift clutch 230. On auxiliary shaft 24 is provided reverse shift clutch 240. 3-5 shift clutch 210, 2-4 shift clutch 220, 1-6 shift clutch 230 and reverse shift clutch 240 are driven by shift actuator "A" (refer to FIG. 1) so as to move axially on the respective shafts.

Shift clutches 210, 220, 230, 240 are axially movable so as to control engagement of the drive-side gears or the driven-side gears with the respective shafts thereby selecting a power transmission route in accordance with a shift instruction.

Then, power transmission routes at respective gears will now be described. In the meantime, at the time of running other than the time of shifting, both of first engine clutch 40a and second engine clutch 40b are basically engaged, and power transmission is carried out by either one of the clutches.

(Neutral)

Both of first engine clutch 40a and second engine clutch 40b are in a state of being released or even if both of engine clutches 40a, 40b are in a state of being engaged, the neutral is attained when each of shift actuators is in a neutral position.

(First Forward Gear)

1-6 shift clutch 230 is driven in the left-hand direction in FIG. 2 by way of first engine clutch 40a. Drive torque is thus transmitted through first engine clutch 40a, first input shaft 21, drive-side first speed gear 31 and driven-side first speed gear 41 on output shaft 23 to a final reduction gear (not shown).

(Second Forward Gear)

2-4 shift clutch 220 is driven in the right-hand direction in FIG. 2 by way of second engine clutch 40b. Drive torque is transmitted through second engine clutch 40b, second input shaft 22, drive-side second speed gear 32 and driven-side second speed gear 42 on output shaft 23 to the final reduction gear.

(Third Forward Gear)

3-5 shift clutch 210 is driven in the right-hand direction in FIG. 2 by way of first engine clutch 40a. Drive torque is transmitted through first engine clutch 40a, first input shaft 21, drive-side third speed gear 33 and driven-side third speed gear 43 on output shaft 23 to the final reduction gear.

(Fourth Forward Gear)

2-4 shift clutch 220 is driven in the left-hand direction in FIG. 2 by way of second engine clutch 40b. Drive torque is transmitted through second engine clutch 40b, second input shaft 22, drive-side fourth speed gear 34 and driven-side fourth speed gear 44 on output shaft 23 to the final reduction gear.

(Fifth Forward Gear State)

3-5 shift clutch 210 is driven in the left-hand direction in FIG. 2 by way of first engine clutch 40a. Drive torque is transmitted through first engine clutch 40a, first input shaft 21, drive-side fifth speed gear 35 and driven-side fifth speed gear on output shaft 23 to the final reduction gear.

(Sixth Forward Gear)

1-6 shift clutch 230 is driven in the right-hand direction in FIG. 2 by way of second engine clutch 40b. Drive torque is transmitted through second engine clutch 40b, second input shaft 22, drive-side sixth speed gear 36 and driven-side sixth speed gear 41 on output shaft 23 to the final reduction gear.

(Reverse Gear)

The reverse gear is attained by driving reverse clutch 240 in the right-hand direction in FIG. 2 by way of first engine clutch 40a. Drive torque is transmitted through first engine clutch 40a, first input shaft 21, first reverse gear R1, second reverse gear R2 and third reverse gear R3 on output shaft 23 to the final reduction gear.

(Shift Control)

Then, a shift control will be described by taking examples to 1-2 upshift and 2-1 downshift.

(1-2 Upshift)

At the time of first forward gear, 1-6 shift clutch 230 is in a state of being driven in the left-hand direction in FIG. 2 by way of first engine clutch 40a as described above. In the meantime, it is considered that second engine clutch 40b is also in a state of being engaged.

When upshift is started, second engine clutch 40b is first released completely. Then, 2-4 shift clutch 220 is driven in the right-hand direction to engage drive-side second speed gear 32 and second input shaft 22 with each other. Since second engine clutch 40b is in a state of being completely released, transmission of drive torque is not performed. This state is referred to as a pre-shift state.

Then, first engine clutch 40a in a state of being engaged is gradually released to cause second input shaft 22 to rotate synchronously with engine speed. When rotation of second input shaft 22 is synchronized with engine speed, 1-6 shift clutch 230 is moved into a neutral position and the frictional engagement force of second engine clutch 40b is increased gradually thereby causing the gear to be upshifted.

(2-1 Downshift)

At the time of second forward gear, 2-4 shift clutch 220 is in a state of being driven in the right-hand direction in FIG. 2 by way of second engine clutch 40b as described above. In the meantime, in a steady state, first engine clutch 40a is in a state of being engaged and 3-5 shift clutch 210 and 1-6 shift clutch 230 are in a state of being released.

When downshift is started, first engine clutch 40a is first released completely. Then, 1-6 shift clutch 230 is driven in the left-hand direction in FIG. 2 to engage driven-side first speed gear 41 and output shaft 23 with each other. Since first engine clutch 40a is in a state of being completely released, transmission of engine power is not performed (pre-shift state).

Then, second engine clutch 40b in a state of being engaged is released gradually to synchronize rotation of first input shaft 21 with engine speed. When rotation of first input shaft 21 is synchronized with engine speed, 2-4 shift clutch 220 is moved into a neutral position and the frictional engagement force of first engine clutch 40a is increased gradually thereby causing the gear to be downshifted.

Shifting to other gear ratios is attained by a basically similar shift control to that described as above, so that description thereto is omitted for brevity.

Figure 3:
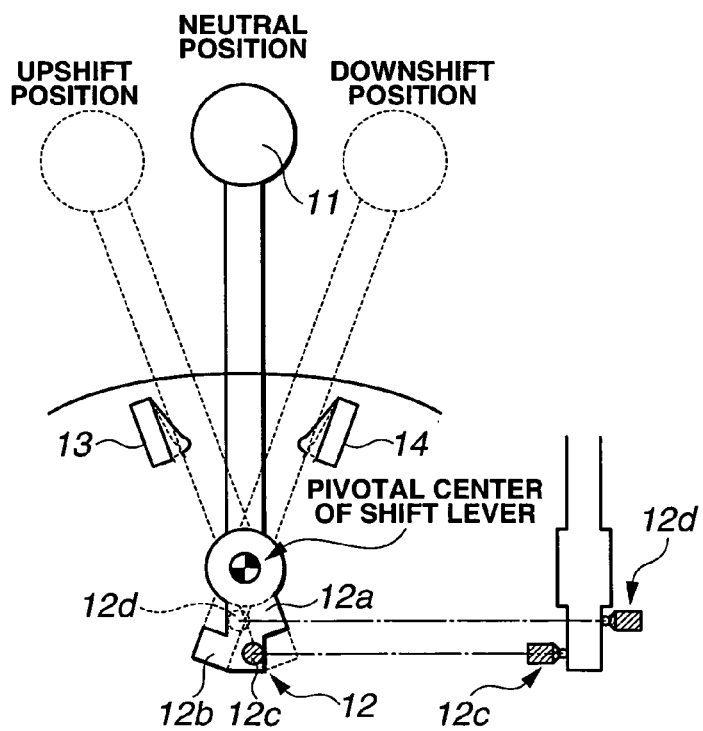
FIG. 3 is a schematic view of a shift mechanism of the automated twin clutch transmission of FIG. 1, which is operated by a vehicle driver.

Referring to FIG. 3, shift mechanism 10 that is operated by a vehicle driver at the time of gear shifting will be described. Shift lever 11 is usually in a neutral state and turned leftward or rightward in FIG. 3 to turn upshift switch 13 or downshift switch 14 on thereby outputting a shift signal to ATCU 80. In this embodiment, a downshift signal is outputted when shift lever 11 is turned rightward and an upshift signal is outputted when shift lever 11 is turned leftward.

At an end portion of shift lever 11 that is located on the opposite side of a shift knob (no numeral) with respect to a pivotal center, there is provided shift start switch mechanism 12. Shift start mechanism 12 includes downshift side start switch 12c and upshift side start switch 12d. Further, shift switch mechanism 12 includes abutment portions 12a, 12b that are abuttingly engageable with shift start switches 12c, 12d, respectively. When shift lever 11 is in the neutral position, both of shift start switches 12c, 12d are abuttingly engaged with abutment portions 12c, 12d and thus held in a state of being turned on.

When shift lever 11 starts turning to an upshift side, abutment potion 12a is disengaged from upshift side shift start switch 12d, thus causing upshift side shift start switch 12*d* to be turned off such that it is determined that upshift (shifting movement) is started. On the other hand, when shift lever 11 starts turning to the downshift side, abutment portion 12*b* is disengaged from downshift side shift start switch 12*c*, thus causing downshift side shift start switch 12*c* to be turned off such that it is determined that downshift (shifting movement) is started.

Figure 4:
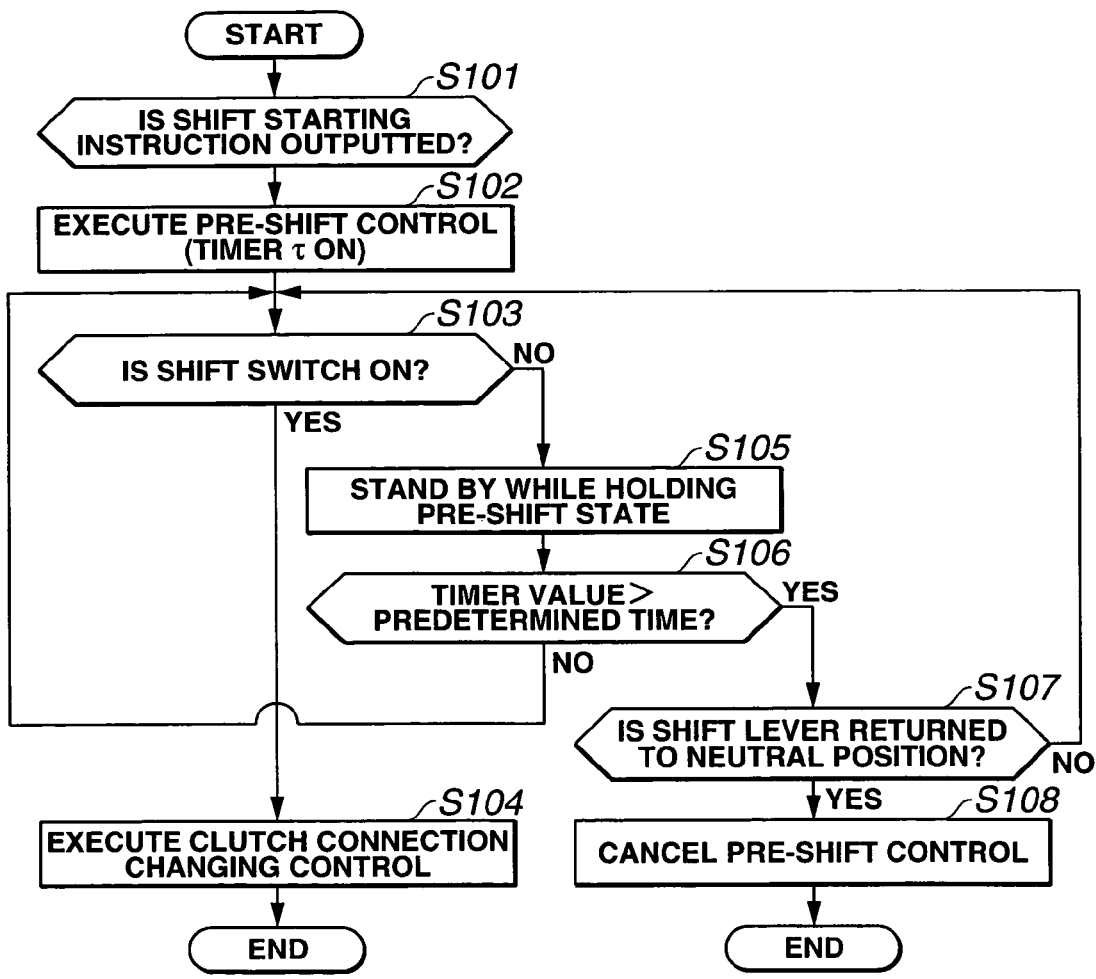
FIG. 4 is a flowchart showing a pre-shift control of the automated twin clutch transmission of FIG. 1.

FIG. 4 is a flowchart showing a pre-shift control that is executed in ATCU 80 at the time of shifting according to the present invention.

In step S101, it is determined whether a shift start switch signal is outputted, that is, it is determined whether a shift starting instruction is issued or outputted. If the shift starting instruction is not issued, the control is ended and if issued the control proceeds to step 102.

In step 102, the above-described pre-shift control is executed and pre-shift timer τ is turned on to start counting.

In step 103, it is determined whether shift switch 13 or 14 is ON. If shift switch 13 or 14 is ON, the control proceeds to step 104. If not, the control proceeds to step 105.

In step 104, a clutch connection changing control is executed.

In step 105, the control stands by while holding the pre-shift state.

In step 106, it is determined whether the timer value becomes equal to or larger than a predetermined time. If not, the control returns back to step 103 to determine whether shift switch 13 or 14 is turned on. If does, the control proceeds to step 107.

In step 107, it is determined whether shift lever 11 is returned to the neutral position. If in the neutral position, the control proceeds to step 108. If not, the control proceeds to step 103 to stand by while holding the pre-shift state.

In step 108, the pre-shift control is cancelled.

A concrete example of the pre-shift control will be described with respect to 2-1 downshift.

Figure 5:
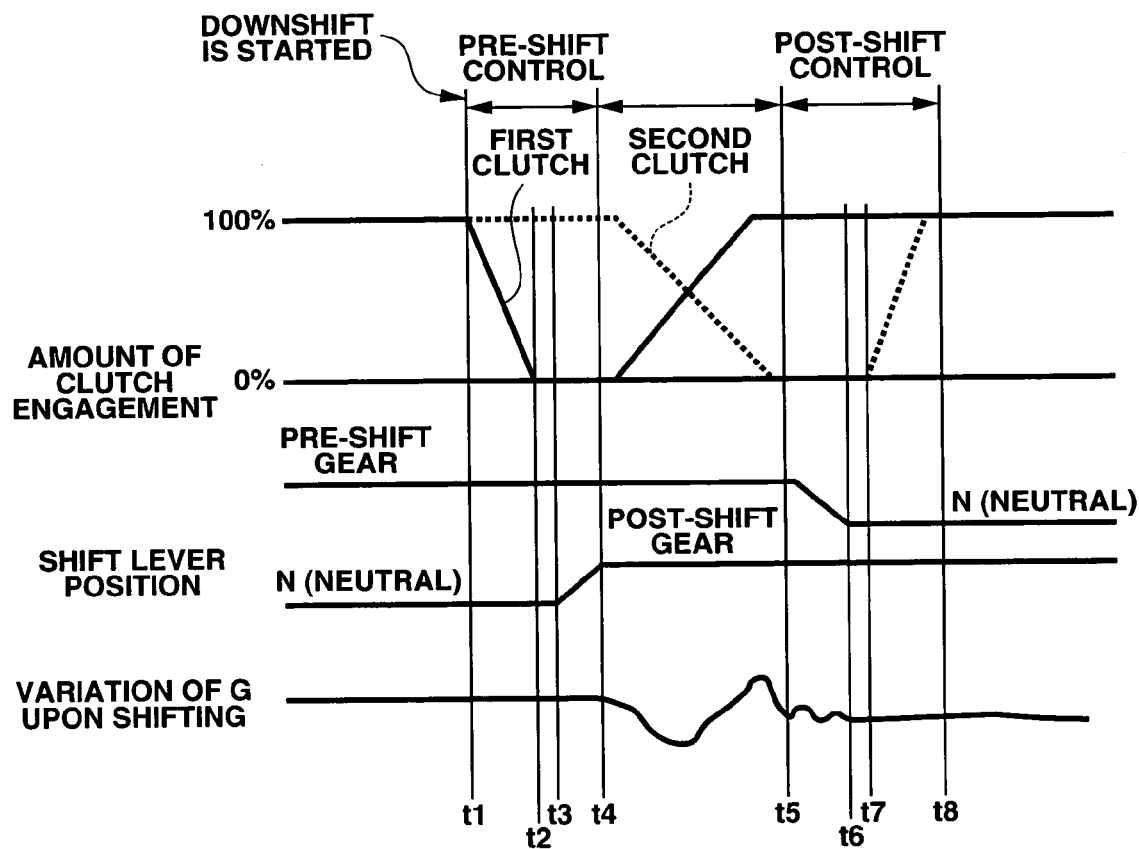
FIG. 5 is a time chart showing a downshift control from a second forward gear ratio to a first forward gear ratio of the automated twin clutch transmission of FIG. 1.

FIG. 5 is a flowchart showing a pre-shift control at the time of 2-1 downshift. At the time of the second forward gear, 2-4 shift clutch 220 is in a state of being driven to the right-hand side in FIG. 2 by way of second engine clutch 40*b*. In the meantime, it is considered that first engine clutch 40*a* is also in a state of being engaged.

(In case shift switch is turned on before timer value becomes equal to or larger than predetermined time)

First, if a shift start signal is outputted from downshift side shift start switch 12*c* at the time of t1, release of first engine clutch 40*a* is started while timer τ is made to start counting. If release of first engine clutch 40*a* is completed at the time t2, 1-6 shift clutch 230 starts shifting from the a released state to an engaged state at the time t3, and at the time t5 driven-side first speed gear 41 and output shaft 23 are engaged with each other. However, since first engine clutch 40*a* is released, transmission of drive torque is not performed. In this manner, by detecting a shifting operation of a vehicle driver, it becomes possible to detect a shifting intension of the vehicle driver at an earlier time and therefore it becomes possible to perform the shift control based on the shifting intension of the vehicle driver. Thus, it becomes possible to attain a rapid shifting without a response delay at the time of shifting.

If downshift switch 14 is turned on at the time t4 when the timer value is less than a predetermined time, second engine clutch 40*b* is released gradually while first engine clutch is engaged gradually.

If at the time of t5 engagement of first engine clutch 40*a* is completed and release of second engine clutch 40*b* is completed, 2-4 shift clutch 220 having been engaged at the time of the second forward gear is driven to the neutral position. If driving of 2-4 shift clutch 220 is completed at the time t6, second engine clutch 40*b* is completely engaged again at the time t7.

(In case pre-shift control is cancelled when timer value becomes equal to or larger than predetermined time)

The control to be made from t1 to t3 is basically the same as that described with respect to the time chart. When timer value becomes equal to or larger than a predetermined time at t4, it is determined whether shift lever 11 has been returned to the neutral position. When returned to the neutral position, the pre-shift control is cancelled and the control is ended. When not returned to the neutral position, the control proceeds to step 103 to confirm whether shift switch 13 or 14 is ON. By this, even if a shift starting instruction is issued contrary to the driver's intension such as a case shift lever 11 is erroneously operated or shift lever 11 is unintentionally touched by the driver who has no intension of carrying out shifting, a shifting action felt or perceived by the vehicle driver is not caused until shift switch 13 or 14 is turned on, i.e., until a definite shifting instruction is issued, thus not giving an embarrassed or strange feel to the driver.

(Second Embodiment)

Figure 6:
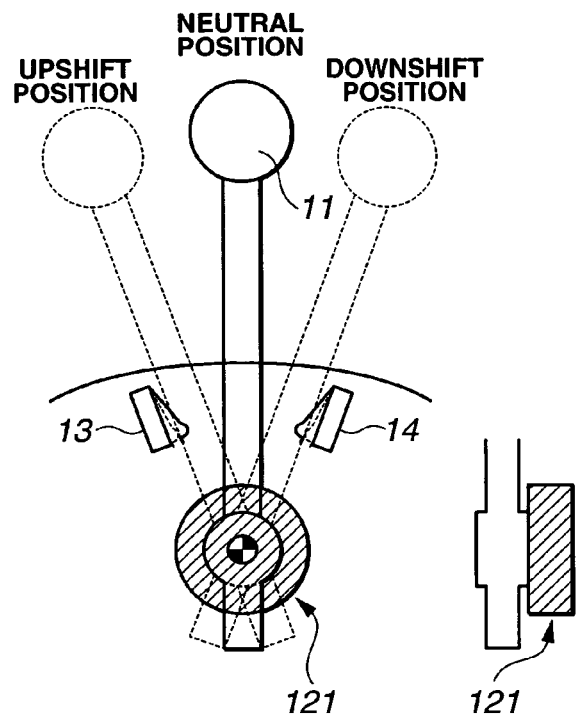
FIG. 6 is a schematic view of a shift mechanism according to a second embodiment of the present invention.

FIG. 6 shows a shift mechanism that is operated by a driver upon shifting according to a second embodiment which is basically the same as the first embodiment so that only a different structure will be described.

In the second embodiment, potentiometer 121 is provided to serve as a means for detecting a shift position. By detecting the shift position of shift lever 11 by potentiometer 121, the intension of the vehicle driver can be detected promptly without delay.

(Third Embodiment)

Figure 7:
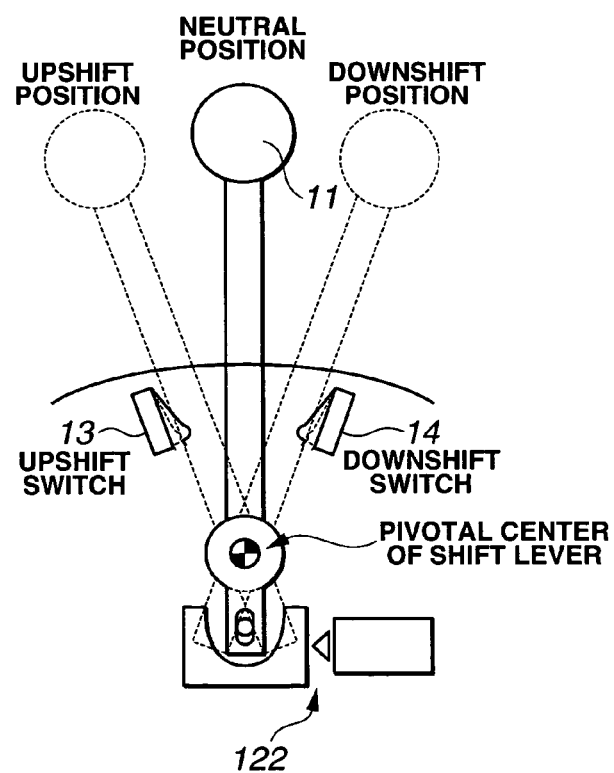
FIG. 7 is a schematic view of a shift mechanism according to a third embodiment of the present invention.

FIG. 7 shows a shift mechanism that is operated by a vehicle driver upon shifting according to a third embodiment which is basically the same as the first embodiment so that only a different structure will be described.

In the third embodiment, stroke sensor 122 is provided as a means for detecting a shift position. By detecting the shift position of shift lever 11 by stroke sensor 122, the intension of the vehicle driver can be detected promptly without delay.

(Fourth Embodiment)

FIG. 8 shows a shift mechanism that is operated by a vehicle driver upon shifting according to a fourth embodiment which is basically the same as the first embodiment so that only a different structure will be described.

In the fourth embodiment, hole element sensor 123 is provided as a means for detecting a shift position. By detecting the shift position of shift lever 11 by hole element sensor 123, the intension of the driver can be detected promptly without delay.

(Fifth Embodiment)

FIGS. 9A and 9B show a shift mechanism that is operated by a driver upon shifting according to a fifth embodiment. In the fifth embodiment, downshift paddle 51 and upshift paddle 52 installed on the back of steering wheel 50 are provided in place of shift lever 11 as shown in FIG. 9A.

FIG. 9B is a schematic view of downshift paddle 51 when observed from the upper side of steering wheel 50. When downshift paddle 51 is in a neutral position thereof, it is brought into contact with downshift side shift start switch 124, thus causing downshift side shift side shift start switch 124 to be turned on. When a shift control (downshift control) is started, paddle 51 is brought out of contact from downshift side shift start switch 124, thus causing downshift side shift start switch 124 to be turned off thereby detecting start of shifting movement. By this, it becomes possible to detect the intension of the vehicle driver promptly without delay.

In the foregoing, it will be understood that ATCU 80 constitutes a shift controller for controlling engagement and release of first and second engine clutches 40a, 40b and shift clutches 210, 220, 230, 240 thereby attaining a desired gear ratio.

It will be further understood that shift lever 11 or shift paddle 51 or 52 of shift mechanism 10 constitutes a shift instructing device operable to instruct a gearshift when operated by a vehicle driver so as to move a predetermined amount from a neutral position.

It will be further understood that shift switch 13 or 14 constitutes a shift instruction outputting device operable to output a shift instruction when shift lever 11 or paddle 51 or 52 (shift instructing device) is caused to move a predetermined amount from a neutral position.

It will be further understood that shift start switch mechanism 12, potentiometer 121, stroke sensor 122, hole element sensor 123 or shift start switch 124 constitutes a shifting movement detecting device operable to detect shifting movement of shift lever 11 or paddle 51 or 52 (shift instructing device) before a shift instruction is outputted by shift switch 13 or 14 (shift instruction outputting device) and output a shift starting instruction representative thereof.

The entire contents of Japanese Patent Application P2003-076447 (filed Mar. 19, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while the embodiment has been described with respect to the case in which a shift control is executed in accordance with a shifting operation of a vehicle driver, this is not for the purpose of limitation. For example, a pre-shift control may be executed in an automated transmission of the kind in which the gear is automatically shifted by using a preset map and in accordance with a driving point that is determined from a vehicle speed and accelerator opening degree. More specifically, the time when an accelerator opening degree variation larger than a predetermined value is caused by a driver is determined as a pre-shift control starting point, and a pre-shift control by which shifting to a gear that is set on the map in the direction in which a driving point-vector variation is caused is performed. By this, a shift control in accordance with the intension of the vehicle driver can be attained. The scope of the invention is defined with reference to the following claims.

What is claimed is:

1. A shift control apparatus for an automated twin clutch transmission including a first input shaft on which a drive-side gear for attaining a first forward gear ratio and a drive-side gear for attaining a third forward gear ratio are supported, a first engine clutch operable to establish a releasable drive connection between an engine and the first input shaft, a second input shaft on which a drive-side gear for attaining a second forward gear ratio and a drive-side gear for attaining a fourth forward gear ratio are supported, a second engine clutch operable to establish a releasable drive connection between the engine and the second input shaft, an output shaft on which driven-side gears meshed with the respective drive-side gears are supported, and a plurality of shift clutches operable to establish releasable drive connections between the drive-side gears and the first and second input shafts and between the driven-side gears and the output shaft, the shift control apparatus comprising:

a shift controller operable to control engagement and release of the first and second engine clutches and the shift clutches thereby attaining a desired gear ratio;

a shift instructing device operable to instruct a gearshift when operated by a vehicle driver so as to move a predetermined amount from a neutral position;

a shift instruction outputting device operable to output a shift instruction when the shift instructing device is caused to move the predetermined amount from the neutral position; and a shifting movement detecting device operable to detect shifting movement of the shift instructing device before the shift instruction is outputted by the shift instruction outputting device and output a shift starting instruction representative thereof;

the shift controller being configured to perform, in response to the shift starting instruction from the shifting movement detecting device, a pre-shift control by releasing one of the first and second engine clutches from a power transmission route of a pre-shift gear ratio and engaging one of the shift clutches corresponding to a post-shift gear ratio, and perform, in response to the shift instruction form the shift instruction outputting device, a gearshift by releasing the other of the first and second engine clutches from the power transmission route of the pre-shift gear ratio and engaging said one of the first and second engine clutches.

2. A shift control apparatus according to claim 1, further comprising a timer that starts counting in response to the shift starting instruction from the shifting movement detecting device, the shift controller being configured to, after the pre-shift control is executed, release said one of the shift clutches and engage said one of the first and second engine clutches having been released by the pre-shift control when a timer value counted by the timer becomes equal to or larger than a predetermined time.

3. A shift control apparatus according to claim 1, wherein the shift instructing device comprises a pivotal shift lever, and the shifting movement detecting device comprises a shift start switch that is brought into contact with the shift lever when the shift lever is in the neutral position and brought out of contact from the shift lever to output the shift starting instruction when the shift lever is moved out of the neutral position.

4. A shift control apparatus according to claim 1, wherein the shift instructing device comprises a shift lever, and the shifting movement detecting device comprises a potentiometer that detects a position of the shift lever.

5. A shift control apparatus according to claim 1, wherein the shift instructing device comprises a shift lever, and the shifting movement detecting device comprises a stroke sensor that detects a position of the shift lever.

6. A shift control apparatus according to claim 1, wherein the shift instructing device comprises a shift lever, and the shifting movement detecting device comprises a hole element sensor that detects a position of the shift lever.

7. A shift control apparatus according to claim 1, wherein the shift instructing device comprises a shift paddle installed on a steering wheel, and the shifting movement detecting device comprises a shift start switch that detects start of movement of the shift paddle out of a neutral position thereof.

8. A shift control apparatus according to claim 1, wherein the shift instructing device comprises a pivotal shift lever, and the shift instruction outputting device comprises a shift switch that is brought into contact with the shift lever to output the shift instruction when the shift lever is caused to move the predetermined amount from the neutral position.

9. A shift control apparatus according to claim 1, wherein the shift instructing device comprises a shift paddle installed on a steering wheel, and the shift instruction outputting device comprises a shift switch that is brought into contact with the shift paddle to output the shift instruction when the shift paddle is caused to move the predetermined amount from the neutral position.

10. An automated twin clutch transmission comprising:
   an output shaft;
   first and second input shafts;
   a first engine clutch operable to establish a releasable drive connection between an engine and the first input shaft;
   a second engine clutch operable to establish a releasable drive connection between the engine and the second input shaft;
   a plurality of drive-side gears supported by the first and second input shafts;
   a plurality of driven-side gears supported by the output shaft;
   a plurality of shift clutches operable to engage the drive-side gears with the first and second input shafts and the driven-side gears with the output shaft, selectively;
   a shift controller operable to control engagement and release of the first and second engine clutches and the shift clutches thereby attaining a desired gear ratio;
   a shift instructing device operable to instruct a gear shift when operated by a vehicle driver so as to move a predetermined amount from a neutral position;
   a shift instruction outputting device that outputs a shift instruction when the shift instructing device is caused to move the predetermined amount from the neutral position; and
   a shifting movement detecting device operable to detect start of shifting movement of the shift instructing device from the neutral position and output a shift starting instruction when the shift instructing device starts moving from the neutral position;
   the shift controller being configured to perform, in response to the shift starting instruction from the shifting movement detecting device, a pre-shift control by releasing one of the first and second engine clutches from a power transmission route of a pre-shift gear ratio and engaging one of the shift clutches corresponding to a post-shift gear ratio, and perform, in response to the shift instruction form the shift instruction outputting device, a gearshift by releasing the other of the first and second engine clutches from the power transmission route of the pre-shift gear ratio and engaging said one of the first and second engine clutches.

11. An automated twin clutch transmission according to claim 10, further comprising a timer that starts counting in response to the shift starting instruction from the shifting movement detecting device, the shift controller being configured to, after the pre-shift control is executed, release said one of the shift clutches and engage said one of the first and second engine clutches having been released by the pre-shift control when a timer value counted by the timer becomes equal to or larger than a predetermined time.

12. An automated twin clutch transmission according to claim 10, wherein the shift instructing device comprises a pivotal shift lever, and the shifting movement detecting device comprises a shift start switch that is brought into contact with the shift lever when the shift lever is in the neutral position and brought out of contact from the shift lever to output the shift starting instruction when the shift lever is moved out of the neutral position.

13. An automated twin clutch transmission according to claim 10, wherein the shift instructing device comprises a shift lever, and the shifting movement detecting device comprises a potentiometer that detects a position of the shift lever.

14. An automated twin clutch transmission according to claim 10, wherein the shift instructing device comprises a shift lever, and the shifting movement detecting device comprises a stroke sensor that detects a position of the shift lever.

15. An automated twin clutch transmission according to claim 10, wherein the shift instructing device comprises a shift lever, and the shifting movement detecting device comprises a hole element sensor that detects a position of the shift lever.

16. An automated twin clutch transmission according to claim 10, wherein the shift instructing device comprises a shift paddle installed on a steering wheel, and the shifting movement detecting device comprises a shift start switch that detects start of movement of the shift paddle out of a neutral position thereof.

17. An automated twin clutch transmission according to claim 10, wherein the shift instructing device comprises a pivotal shift lever, and the shift instruction outputting device comprises a shift switch that is brought into contact with the shift lever to output the shift instruction when the shift lever is caused to move the predetermined amount from the neutral position.

18. An automated twin clutch transmission according to claim 10, wherein the shift instructing device comprises a shift paddle installed on a steering wheel, and the shift instruction outputting device comprises a shift switch that is brought into contact with the shift paddle to output the shift instruction when the shift paddle is caused to move the predetermined amount from the neutral position.

19. A shift control method for an automated twin clutch transmission including a first input shaft on which a drive-side gear for attaining a first forward gear ratio and a drive-side gear for attaining a third forward gear ratio are supported, a first engine clutch operable to establish a releasable drive connection between an engine and the first input shaft, a second input shaft on which a drive-side gear for attaining a second forward gear ratio and a drive-side gear for attaining a fourth forward gear ratio are supported, a second engine clutch operable to establish a releasable drive connection between the engine and the second input shaft, an output shaft on which driven-side gears meshed with the respective drive-side gears are supported, a plurality of shift clutches operable to establish releasable drive connections between the drive-side gears and the first and second input shafts and between the driven-side gears and the output shaft, a shift controller operable to control engagement and release of the first and second engine clutches and the shift clutches thereby attaining a desired gear ratio, a shift instructing device operable to instruct a gearshift when operated by a vehicle driver so as to move a predetermined amount from a neutral position, and a shift instruction outputting device operable to output a shift instruction when the shift instructing device is caused to move the predetermined amount from the neutral position, the shift control method comprises:
   detecting shifting movement of the shift instructing device before the shift instruction is outputted by the shift instruction outputting device and outputting a shift starting instruction representative thereof;
   performing, in response to the shift starting instruction, a pre-shift control by releasing one of the first and second engine clutches from a power transmission route of a pre-shift gear ratio and engaging one of the shift clutches corresponding to a post-shift gear ratio; and performing, in response to the shift instruction form the shift instruction outputting device, a gearshift by releasing the other of the first and second engine clutches from the power transmission route of the pre-shift gear ratio and engaging said one of the first and second engine clutches.

20. A shift control method according to claim 19, wherein the automated twin clutch transmission further includes a timer that starts counting in response to the shift starting instruction from, the shift control method further comprising, after the pre-shift control is executed, releasing said one of the shift clutches and engaging said one of the first and second engine clutches having been released by the pre-shift control when a timer value counted by the timer becomes equal to or larger than a predetermined time.

* * * * *